United States Patent
Wong et al.

(10) Patent No.: US 12,417,309 B1
(45) Date of Patent: Sep. 16, 2025

(54) SECURING SENSITIVE AND PERSONAL DATA THROUGH COGNITIVE ACTIONS

(71) Applicant: Blue Yonder Group, Inc., Scottsdale, AZ (US)

(72) Inventors: Bernie Wong, Clearwater Beach, FL (US); Peter Edward Stubbs, Georgetown, MA (US); Raghuveer Prasad Nagar, Rajasthan (IN); Balaji Natarajan, Shrewsbury, MA (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 169 days.

(21) Appl. No.: 18/383,294

(22) Filed: Oct. 24, 2023

Related U.S. Application Data (60) Provisional application No. 63/451,752, filed on Mar. 13, 2023.

(51) Int. Cl.
   *G06F 21/62* (2013.01)

(52) U.S. Cl.
   CPC .................. *G06F 21/6245* (2013.01)

(58) Field of Classification Search
   CPC ...... G06F 21/6245; G06F 32/50; G06Q 10/10
   See application file for complete search history.

(56) References Cited

U.S. PATENT DOCUMENTS

| | | | | |
|---|---|---|---|---|
| 8,589,697 | B2 * | 11/2013 | Subramanian | G06F 21/6218 713/193 |
| 9,038,134 | B1 * | 5/2015 | Ackerman | H04L 63/08 726/2 |
| 10,158,653 | B1 * | 12/2018 | Magcale | H04L 63/1441 |
| 10,193,695 | B1 * | 1/2019 | Endress | G06F 18/214 |
| 10,817,619 | B1 * | 10/2020 | Kolli | G06F 21/552 |

(Continued)

OTHER PUBLICATIONS

Mitrou, Lilian. "Data protection, artificial intelligence and cognitive services: is the general data protection regulation (GDPR)'artificial intelligence-proof' ?. " Artificial Intelligence and Cognitive Services: Is the General Data Protection Regulation (GDPR)Artificial Intelligence-Proof (2018).*

(Continued)

*Primary Examiner* — Jimmy H Tran
(74) *Attorney, Agent, or Firm* — Spencer Fane LLP; Steven J. Laureanti

(57) ABSTRACT

A system and method are disclosed for event-based data security. The method includes learning customer events which require an action on sensitive and personal information (SPI), learning a mapping between the customer events and a first subset of the SPI, detecting for a particular customer an event having an impact on the SPI of the particular customer, determining a second subset of the SPI that may be impacted by the event, determining an action to perform for the second subset of the SPI, and performing the action on the second subset of SPI. The method further includes learning the mapping using data streams, where the data streams comprise security policies, customer interactions, publicly available information and a product catalog. The method further includes where the action comprises moving the SPI, modifying the SPI, masking the SPI or removing the SPI.

20 Claims, 4 Drawing Sheets

(56) References Cited

U.S. PATENT DOCUMENTS

| | | | | |
|---|---|---|---|---|
| 11,727,152 | B2* | 8/2023 | Springer | H04W 12/02 |
| | | | | 726/26 |
| 11,775,673 | B1* | 10/2023 | Shintre | G06F 21/00 |
| | | | | 726/30 |
| 11,798,090 | B1* | 10/2023 | Nazir | G06N 3/084 |
| 2008/0304663 | A1* | 12/2008 | Canard | G06F 21/6254 |
| | | | | 380/45 |
| 2009/0007227 | A1* | 1/2009 | Burgess | G06F 21/316 |
| | | | | 726/28 |
| 2009/0254971 | A1* | 10/2009 | Herz | G06Q 10/10 |
| | | | | 726/1 |
| 2011/0320805 | A1* | 12/2011 | Chaves | H04L 67/12 |
| | | | | 380/259 |
| 2013/0097664 | A1* | 4/2013 | Herz | G06Q 30/02 |
| | | | | 726/1 |
| 2013/0133026 | A1* | 5/2013 | Burgess | H04L 12/6418 |
| | | | | 726/28 |
| 2013/0266127 | A1* | 10/2013 | Schachter | G10L 25/48 |
| | | | | 379/88.01 |
| 2014/0208225 | A1* | 7/2014 | Anand | G06F 21/31 |
| | | | | 715/741 |
| 2014/0283089 | A1* | 9/2014 | Arya | G06F 21/6245 |
| | | | | 726/26 |
| 2016/0098576 | A1* | 4/2016 | Allen | G06F 21/6245 |
| | | | | 726/29 |
| 2016/0132696 | A1* | 5/2016 | Vidhani | G06Q 30/00 |
| | | | | 726/28 |
| 2016/0364736 | A1* | 12/2016 | Maugans, III | H04L 67/535 |
| 2016/0371703 | A1* | 12/2016 | Monegan | H04L 67/148 |
| 2017/0063903 | A1* | 3/2017 | Muddu | H04L 63/1408 |
| 2017/0220928 | A1* | 8/2017 | Hajizadeh | G06Q 10/0637 |
| 2018/0165586 | A1* | 6/2018 | Saxena | G06N 20/20 |
| 2018/0232528 | A1* | 8/2018 | Williamson | G06F 21/6245 |
| 2018/0232657 | A1* | 8/2018 | Acharya | G06Q 10/10 |
| 2018/0232658 | A1* | 8/2018 | Acharya | G06N 7/01 |
| 2018/0232659 | A1* | 8/2018 | Ranatunga | G06Q 30/0241 |
| 2018/0246968 | A1* | 8/2018 | Barker | G06Q 10/0631 |
| 2019/0034660 | A1* | 1/2019 | Ford | G06F 21/552 |
| 2019/0244149 | A1* | 8/2019 | Krishnaswamy | G06Q 10/0637 |
| 2019/0303948 | A1* | 10/2019 | Reich | G06F 16/9035 |
| 2019/0377897 | A1* | 12/2019 | Griffin | G06F 21/6245 |
| 2020/0202039 | A1* | 6/2020 | Madisetti | G06F 21/6218 |
| 2020/0234605 | A1* | 7/2020 | Shuart | G06F 21/316 |
| 2020/0278900 | A1* | 9/2020 | Abdelsalam | G06F 11/3476 |
| 2020/0320406 | A1* | 10/2020 | Antonatos | G06F 21/6254 |
| 2021/0026821 | A1* | 1/2021 | Glidden | H04L 63/0414 |
| 2021/0073804 | A1* | 3/2021 | Kikinis | G06Q 20/3276 |
| 2021/0133350 | A1* | 5/2021 | Kirti | G06F 21/6245 |
| 2021/0133557 | A1* | 5/2021 | Iyoob | G06F 40/205 |
| 2021/0150056 | A1* | 5/2021 | Vax | G06F 16/285 |
| 2021/0157950 | A1* | 5/2021 | Turano | G06F 21/6245 |
| 2021/0174372 | A1* | 6/2021 | Jadhav | H04L 51/04 |
| 2021/0352078 | A1* | 11/2021 | Mallya | G06N 20/00 |
| 2021/0366586 | A1* | 11/2021 | Ryan | G06Q 20/3224 |
| 2021/0406444 | A1* | 12/2021 | Vontobel | G06Q 10/10 |
| 2022/0027788 | A1* | 1/2022 | Mohandoss | G06N 20/00 |
| 2022/0036708 | A1* | 2/2022 | Rey | G06F 21/84 |
| 2022/0179978 | A1* | 6/2022 | Stroila | G06F 21/6245 |
| 2022/0207636 | A1* | 6/2022 | Nalluri | G06F 21/6245 |
| 2023/0419184 | A1* | 12/2023 | Wick | G06N 20/00 |
| 2023/0421364 | A1* | 12/2023 | Stapleton | H04L 9/14 |
| 2024/0054205 | A1* | 2/2024 | Goodsitt | H04L 9/0891 |
| 2024/0095394 | A1* | 3/2024 | Madhavan | G06N 20/00 |
| 2024/0119174 | A1* | 4/2024 | Doerr | H04L 9/3213 |
| 2024/0396920 | A1* | 11/2024 | Bonney | H04L 63/1433 |

OTHER PUBLICATIONS

Irwin, Luke, "How to write a GDPR data retention policy—with template," IT Governance Blog, https://www.itgovernance.co.uk/blog/top-tips-for-data-retention-under-the-gdpr, Jan. 11, 2021.

Helmore, Edward, "Tech companies in spotlight as US abortion ruling sparks privacy threat," The Guardian, https://www.theguardian.com/us-news/2022/jul/02/abortion-tech-companies-data-police-privacy, Jul. 2, 2022.

Rijnders, Erjen, "GDPR: how to automatically delete sensitive content," erjenrijnder.nl in Azure Information Protection, https://erjenrijnders.nl/2018/08/21/gdpr-how-to-automatically-delete-sensitive-content/, Aug. 21, 2018.

* cited by examiner

SECURING SENSITIVE AND PERSONAL DATA THROUGH COGNITIVE ACTIONS

CROSS-REFERENCE TO RELATED APPLICATIONS

The present disclosure is related to that disclosed in the U.S. Provisional Application No. 63/451,752, filed Mar. 13, 2023, entitled "Securing Sensitive and Personal Data through Cognitive Actions." U.S. Provisional Application No. 63/451,752 is assigned to the assignee of the present application. The present invention hereby claims priority under 35 U.S.C. § 119 (e) to U.S. Provisional Application No. 63/451,752.

TECHNICAL FIELD

The present disclosure relates generally to data processing and specifically to managing the security of sensitive user data.

BACKGROUND

In many industries, businesses or other entities may store various user data to improve the quality of services provided to users. However, in many cases, this user data may be sensitive and personal information (SPI). The storage of such SPI data is subject to various rules and policies, but while such policies may define how to store SPI data, no such policies exist for when such data should be purged. For example, SPI data should not be stored once it is unlikely to be used in the future, but current data storage systems and policies provide no mechanism for determining when data is unlikely to be used. Some data storage systems employ time window to purge data, meaning SPI data will be purged if not used within a certain time period. However the use of time windows provides may difficulties. First, purging SPI data based on time windows is inefficient if the SPI data is in fact required again after being purged, resulting in additional overhead both to system providers and users when the SPI data must be re-created. Second, purging SPI data based on time windows is rigid, and may result in the storage of data for longer than actually necessary, again resulting in overhead costs to system providers in addition to being non-user friendly. Third, purging SPI data based on time windows may be incompliant with SPI storage laws, if for example a user's SPI data is retained even when the user has moved to a different country. For at least these reasons, current systems for storing and purging SPI data are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Embodiments provide systems and methods of an event-based framework to manage the sensitive and personal information of customers. Embodiments of the systems and methods disclosed herein may learn and detect events which indicate an action should be taken on user data, and then accordingly determine and perform appropriate actions on sensitive and personal information stored within the user data, such as moving, modifying or removing the sensitive and personal information. Embodiments may perform actions on subsets of the sensitive and personal information through correlation of such subsets with the events.

Embodiments may predict a requirement of actioning on sensitive and personal information of a customer based on purchased products and quantities thereof and may provide real-time customer service assistance allowing users to confirm detected events, or the actions to be taken in response to events. Embodiments may determine and execute validation and feedback collection for the detected actions, which may then be used to perform reinforcement learning. Use of embodiments may increase data security and privacy for customers or end users of a data management system, as well as improving the data management system's compliance with data security laws and regulations. Use of embodiments may increase customer loyalty for operators of data management systems employing embodiments, by providing superior data security and data privacy for sensitive and personal data for users or customers.

As used herein, the term "customer" means not just purchasers of products, but any user for which personal data may be stored within a supply chain network or other data processing network, such as recipients of shipments, users who have created customer profiles or any other person associated with SPI data stored in supply chain network 100.

Implementation of the systems and method described herein may include the pre-registration of users to data collection and processing services, in order to further protect user data privacy.

Figure 1:
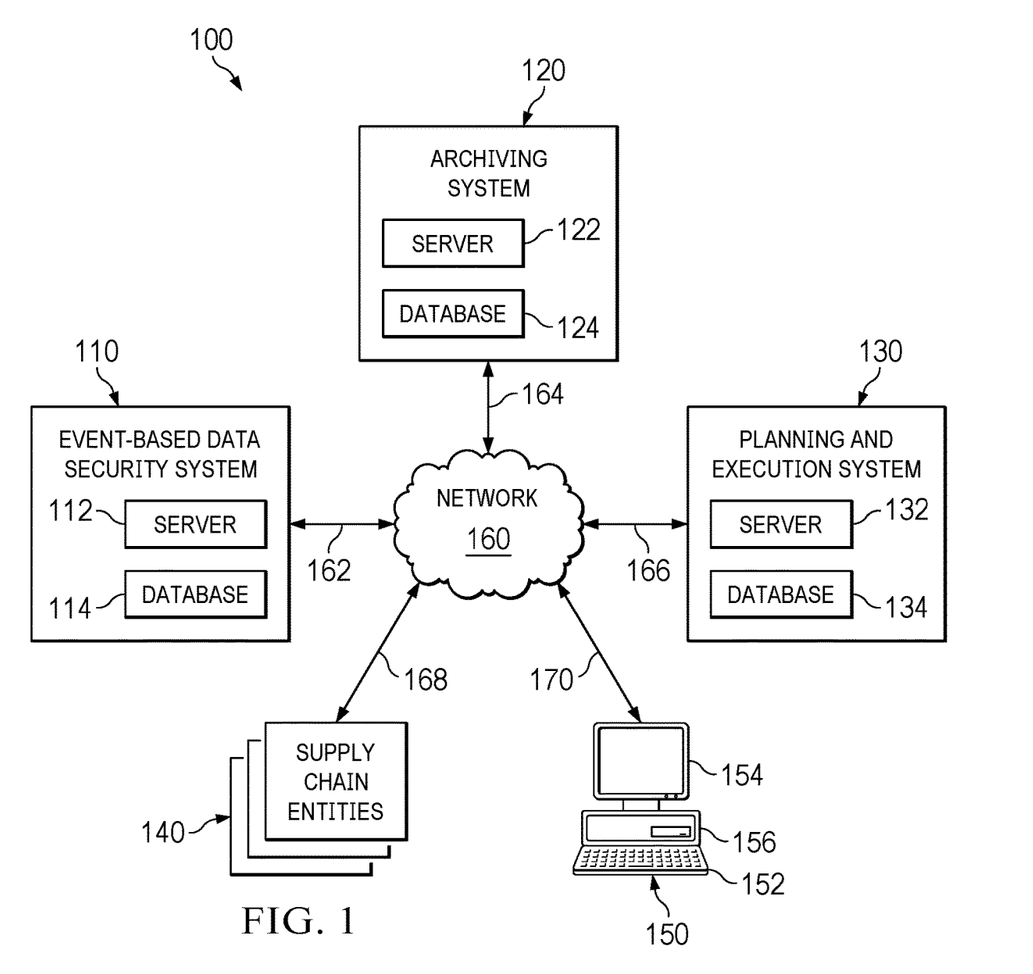
FIG. 1 illustrates a supply chain network in accordance with a first embodiment.

FIG. 1 illustrates supply chain network 100 in accordance with a first embodiment. Supply chain network 100 comprises event-based data security system 110, archiving system 120, planning and execution system 130, one or more supply chain entities 140, computer 150, network 160, and one or more communication links 162-170. Although a single event-based data security system 110, a single archiving system 120, a single planning and execution system 130, one or more supply chain entities 140, a single computer 150, a single network 160, and one or more communication links 162-170 are shown and described, embodiments contemplate any number of event-based data security systems 110, archiving systems 120, planning and execution systems 130, supply chain entities 140, computers 150, networks 160, or communication links 162-170, according to particular needs. Although one example of a supply chain network 100 is shown and described, embodiments contemplate any configuration of supply chain network 100, without departing from the scope of the present disclosure.

In one embodiment, event-based data security system 110 comprises server 112 and database 114. As described in further detail below, event-based data security system 110 can learn and correlate various events related to user activity (user events) to sensitive and personal information (SPI) data of the users. Event-based data security system 110 may thereafter detect a user event that indicates one or more actions should be taken with respect to a particular user's SPI data and determine an action to take in response. In embodiments, event-based data security system 110 may prompt the user for confirmation of the event and/or action before taking the action. Event-based data security system 110 may then take the determined action, which may be moving, modifying, masking, or removing part or all of the user's SPI data, though other possible data actions may be taken in some circumstances.

Archiving system 120 comprises server 122 and database 124. Although archiving system 120 is shown as comprising a single server 122 and a single database 124, embodiments contemplate any suitable number of servers 122 or databases 124 internal to or externally coupled with archiving system 120. Server 122 may support one or more processes for receiving and storing data from planning and execution system 130 and/or one or more computers 150 of supply chain network 100. According to some embodiments, archiving system 120 comprises an archive of data received from planning and execution system 130 and/or one or more computers 150 of supply chain network 100. Archiving system 120 provides archived data to event-based data security system 110 and/or planning and execution system 130. Server 122 may store the received data in database 124. Database 124 may comprise one or more databases or other data storage arrangements at one or more locations, local to, or remote from, the server.

According to an embodiment, planning and execution system 130 comprises server 132 and database 134. Supply chain planning and execution is typically performed by several distinct and dissimilar processes, including, for example, demand forecasting, production planning, supply planning, distribution planning, execution, transportation management, warehouse management, fulfillment, procurement, and the like. Server 132 comprises one or more modules, such as, for example, an order capture module, a sourcing module, a scheduling module, and/or a pick-pack-ship module for performing one or more order fulfillment processes. Server 132 stores and retrieves data from database 134 or one or more locations in supply chain network 100. In addition, planning and execution system 130 operates on one or more computers 150 that are integral to or separate from the hardware and/or software that support archiving system 120 and event-based data security system 110.

One or more supply chain entities 140 may represent one or more suppliers, manufacturers, distribution centers, and retailers in one or more supply chain networks, including one or more enterprises. One or more suppliers may be any suitable entity that offers to sell or otherwise provides one or more items or components to one or more manufacturers or buyers. One or more suppliers may, for example, receive an item from a first supply chain entity 140 in supply chain network 100 and provide the item to another supply chain entity 140, which in some embodiments may be a buyer, a customer or an end user. Items may comprise, for example, components, materials, products, parts, supplies, or other items, that may be used to produce products. In addition, or as an alternative, an item may comprise a supply or resource that is used to manufacture the item but does not become a part of the item. In embodiments, items may comprise a service, such as an installation service. One or more suppliers may comprise automated distribution systems that automatically transport items to one or more manufacturers based, at least in part, on a supply chain plan having a material or capacity reallocation, current and projected inventory levels, and/or one or more additional factors described herein.

A manufacturer may be any suitable supply chain entity 140 that manufactures at least one product. A manufacturer may use one or more items during the manufacturing process to produce any manufactured, fabricated, assembled, or otherwise processed item, material, component, good or product. In one embodiment, a product represents an item ready to be supplied to, for example, another supply chain entity 140, such as a supplier, an item that needs further processing, or any other item. A manufacturer may, for example, produce and sell a product to a supplier, another manufacturer, a distribution center, a retailer, a customer, or any other suitable person or entity. Such manufacturers may comprise automated robotic production machinery that produce products based, at least in part, on a supply chain plan having a material or capacity reallocation, current and projected inventory levels, and/or one or more additional factors described herein.

One or more distribution centers may be any suitable supply chain entity 140 that offers to sell or otherwise distributes at least one product to one or more retailers and/or customers. Distribution centers may, for example, receive a product from a first supply chain entity 140 in supply chain network 100 and store and transport the product for a second supply chain entity 140. Such distribution centers may comprise automated warehousing systems that automatically transport products to one or more retailers or customers and/or automatically remove an item from, or place an item into, inventory based, at least in part, on a supply chain plan having a material or capacity reallocation, current and projected inventory levels, and/or one or more additional factors described herein.

One or more retailers may be any suitable supply chain entity 140 that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location. One or more retailers may also be a shopping mall or a marketplace. As used herein, the term "shopping mall" may refer to a physical building containing one or more retail stores, but may also refer to other collections of related or physically co-located retailers or storefronts, such as stores located in a city center, stores located on a particular street, stores in a particular downtown area or other city subsection, or any other collection of individual retailers acting together to provide a consolidated delivery service or consolidated promotion service as described herein.

The same supply chain entity 140 may simultaneously act as any one or more suppliers, manufacturers, distribution centers, and retailers. For example, one or more supply chain entities 140 acting as a manufacturer could produce a product, and the same entity could act as a supplier to supply a product to another supply chain entity.

As shown in FIG. 1, supply chain network 100 comprising event-based data security system 110, archiving system 120, and planning and execution system 130 may operate on one or more computers 150 that are integral to or separate from the hardware and/or software that support event-based data security system 110, archiving system 120, and planning and execution system 130. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer-readable medium, magnetic computer disks, flash drives, CD-ROM, in-memory device, or other suitable media to receive output from and provide input to supply chain network 100.

One or more computers 150 may include one or more processors 156 and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field-programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from event-based data security system 110, archiving system 120, and planning and execution system 130. In addition, each of the one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with event-based data security system 110 and archiving system 120.

In one embodiment, event-based data security system 110, archiving system 120, planning and execution system 130, supply chain entities 140 and computer 150 may be coupled with network 160 using one or more communication links 162-170, which may be any wireline, wireless, or other link suitable to support data communications between event-based data security system 110, archiving system 120, planning and execution system 130, supply chain entities 140, computer 150, and network 160 during operation of supply chain network 100. Although communication links 162-170 are shown as generally coupling event-based data security system 110, archiving system 120, planning and execution system 130, supply chain entities 140 and computer 150 to network 160, any of event-based data security system 110, archiving system 120, planning and execution system 130, supply chain entities 140 and computer 150 may communicate directly with each other, according to particular needs.

In another embodiment, network 160 includes the Internet and any appropriate local area networks (LANs), metropolitan area networks (MANs), or wide area networks (WANs) coupling event-based data security system 110, archiving system 120, planning and execution system 130, supply chain entities 140 and computer 150. For example, data may be maintained locally too, or externally of, event-based data security system 110, archiving system 120, planning and execution system 130, supply chain entities 140 and one or more computers 150 and made available to one or more associated users of event-based data security system 110, archiving system 120, planning and execution system 130, supply chain entities 140 and one or more computers 150 using network 160 or in any other appropriate manner. For example, data may be maintained in a cloud database at one or more locations external to event-based data security system 110, archiving system 120, planning and execution system 130, supply chain entities 140 and one or more computers 150 and made available to one or more associated users of event-based data security system 110, archiving system 120, planning and execution system 130, supply chain entities 140 and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
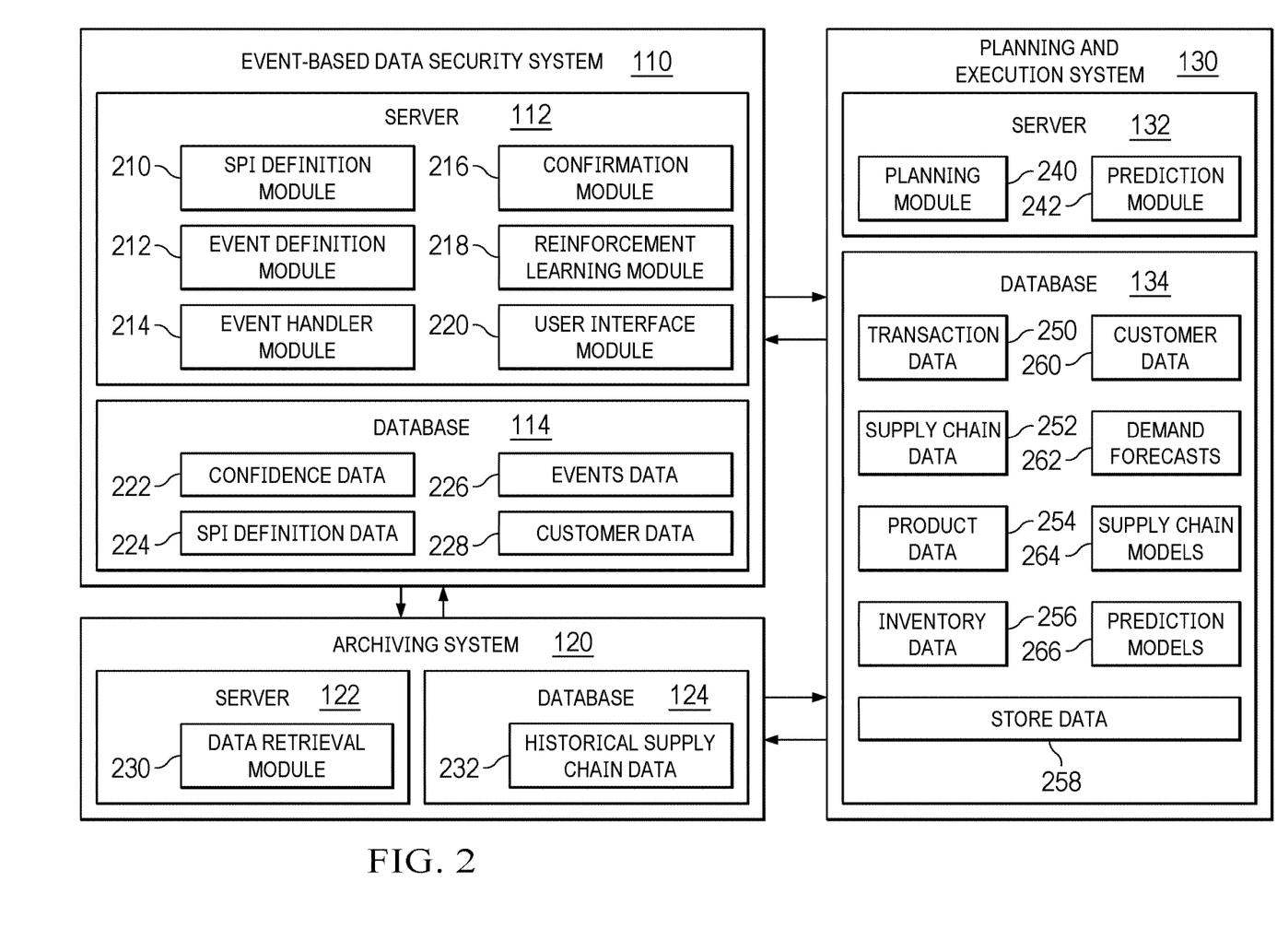
FIG. 2 illustrates the event-based data security system, the archiving system, and the planning and execution system of FIG. 1 in greater detail, in accordance with an embodiment.

FIG. 2 illustrates event-based data security system 110, archiving system 120, and planning and execution system 130 of FIG. 1 in greater detail, in accordance with an embodiment. Event-based data security system 110 may comprise server 112 and database 114, as described above. Although event-based data security system 110 is shown as comprising a single server 112 and a single database 114, embodiments contemplate any suitable number of servers 112 or databases 114 internal to or externally coupled with event-based data security system 110.

Server 112 comprises SPI definition module 210, event definition module 212, event handler module 214, confirmation module 216, reinforcement learning module 218 and user interface module 220. Although server 112 is shown and described as comprising a single SPI definition module 210, a single event definition module 212, a single event handler module 214, a single confirmation module 216, a single reinforcement learning module 218, and a single user interface module 220, embodiments contemplate any suitable number or combination of these located at one or more locations, local to, or remote from event-based data security system 110, such as on multiple servers or computers at one or more locations in supply chain network 100.

Database 114 may comprise one or more databases or other data storage arrangements at one or more locations, local to, or remote from, server 112. Database 114 of event-based data security system 110 comprises, for example, confidence data 222, SPI definitions data 224, events data 226, and customer data 228. Although database 114 is shown and described as comprising confidence data 222, SPI definitions data 224, events data 226, and customer data 228, embodiments contemplate any suitable number or combination of data, located at one or more locations, local to, or remote from, event-based data security system 110, according to particular needs.

In an embodiment, SPI definition module 210 defines categories of Sensitive and Personal Information, or SPI, for end users or customers. For example, SPI may include shipping addresses, phone numbers, payment details, or any other personal information for end users or customers. In embodiments, the categories of SPI may be defined by an administrator or according to a security policy. In embodiments, SPI definition module 210 may monitor the security policy, which may be continuously revised, and organizational communications to enhance and revise the defined SPI categories. SPI definition module 210, using real-time internet search tools, may determine additional SPI categories and, in some cases, may present the additional SPI categories for approval by the administrator. In embodiments, SPI definition module 210 applies natural language processing (NLP) classification techniques, such as Naïve Bayes, to determine the exact attributes and properties which should be part of SPI.

In an embodiment, event definition module 212 defines events which may indicate that a change to customer SPI data is required. For example, an event may be a customer moving to a new address, changing an email address or various other events that may impact the accuracy of currently-stored customer data. In embodiments, an administrator may initially configure the available events to match a security or data retention policy. Event definition module 212 may analyze an organizational security policy and organizational communications, along with publicly available information and catalog definitions, to define additional events. As an example of using catalog definitions, a particular customer purchasing a large quantity of shipping boxes may indicate the customer is moving. In embodiments, event definition module 212 applies speech-to-text conversion followed by NLP for monitoring customer interactions with customer service, in order to identify customer interactions that lead to particular events. Event definition module 212 may also learn what subset of the SPI is impacted by a particular event, such as a customer address being impacted by a "move" event.

In an embodiment, event handler module 216 detects an event of the one or more events defined by event definition module 212 and updates customer data 228 accordingly. In embodiments, event handler module 216 may monitor customer data 228, such as purchase history, customer service interactions, and other types of data, and based on such monitoring, may determine, with confidence factor F1, if a particular customer is likely to have an event, is currently having an event, or has already had an event among the defined events. Event handler module 216, based on the defined subsets of impacted SPI, determines which portions of the customer's SPI require an action with a confidence factor F2. A threshold, described herein as a Cognitive Action Threshold, may be configured by an administrator or according to a data security policy. In embodiments, the administrator can also configure the Cognitive Action Threshold to require confirmation from the administrator. For example, if the Cognitive Action Threshold is configured as 80%, cases of more than 80% may be reviewed by the administrator and cases below or at 80% may be reviewed by customers. In embodiments, an Ignorance Threshold, may also be configured indicating that no action should be taken when confidence factors F1 or F2 for a detected event are less than the Ignorance Threshold value. Event handler module 216, after determining an event has occurred, performs the actions on the customer's SPI according to the event definition. In embodiments, the actions performed by event handler module 216 may include moving SPI, masking SPI, removing or deleting SPI or otherwise modifying SPI, such as updating a particular field of the SPI.

In an embodiment, confirmation module 216 prompts the customer to confirm if the event as detected by event handler module 216 is accurate, and if so, to proceed with one or more actions on the customer's SPI. Based on the confidence factors F1 and F2 described above, confirmation module 216 using the configured thresholds described above, decides whether confirmation from the customer is required. If an interaction between the customer and a customer service representative (CSR) is ongoing, event handler module 216 may generate a message for the CSR so that the CSR can receive a confirmation of the event from the customer during the ongoing interaction. In embodiments, event handler module 216 uses natural language synthesis techniques to generate messages. For example, one such generated message may be "[Customer], if you do not mind, may we know if you are moving to a different address?"

In an embodiment, reinforcement learning module 218 uses reinforcement learning to improve future recommendations based on customer responses to prompted confirmation requests. In embodiments, reinforcement learning module 218 collects feedback from all users, meaning both administrators and customers, on the recommendations of actions to take on SPI. In embodiments, if a user accepts a recommendation, it is considered a reward for the purposes of reinforcement learning, while if the recommendation is rejected it is considered a penalty for the purposes of reinforcement learning. For example, if event handler module 216 detects a move event using customer service data, and the customer has accepted an address recommended as a new address, reinforcement learning module 218 may increase the frequency of recommending address updates based on customer service data. As a further example, if event handler module 216 detects a move using mobile app location data, and the customer has rejected the newly recommended address, reinforcement learning module 218 may reduce the frequency of recommending address updates based only on mobile app location data. In embodiments, policy reinforcement techniques such as state-action-reward-state-action (SARSA) can be used by reinforcement learning module 218.

In an embodiment, user interface module 220 may display one or more graphical user interfaces (GUIs) on an output device of event-based data security system 110. The GUIs may be used to display information to a user of event-based data security system 110 as well as receive input from the user of event-based data security system 110. For example, the GUIs may be used to present one or more event confirmation prompts to a customer. In other examples, the GUIs may be used to present one or more SPI definition prompts or event definition prompts to an administrator of event-based data security system 110.

In an embodiment, confidence data 222 comprises one or more confidence factors as calculated by event handler module 216. Confidence data 222 may further comprise the configured Cognitive Action Threshold and Ignorance Threshold as described above. Confidence data 222 may be used by confirmation module 216 to determine if customer or administrator confirmation is required before taking action on or more detected events.

In an embodiment, SPI definitions data 224 comprises the categories of SPI as defined by SPI definition module 210. As described in further detail below the SPI definitions may be defined according to security policies of one or more supply chain entities, customer interactions with one or more supply chain entities, publicly available information of customers and product catalog definitions of one or more supply chain entities. In embodiments, the SPI definitions may also be generated by an administrator or manager of event-based data security system 110.

In an embodiment, events data 226 comprises the events defined by event definition module 212. In embodiments, defined events may include relocation to a different country, permanent relocation to another address within the same country, temporary movement to another address without any visit probability during movement period (such as jail sentence), customer life events (such as marriages or new jobs) or changing companies. Events data 226 further comprises the subsets of SPI and recommended events associated with a particular event.

In the example of a relocation to a different country event, the impacted SPI may be all country related information requiring modification, while all customer data may require movement between data centers to physically locate customer data 228 in the same country as the customer's new country. In the example of a relocation within a country event, the impacted SPI may be the customer's address requiring deletion. In the example of a temporary movement event, the impacted SPI may be a customer's previous address requiring masking. In the example of a customer life event, the impacted SPI may be a customer's new address requiring addition as a primary address, while the customer's prevision address requires modification to be a secondary address. In the example of a changing company event, the impacted SPI may be the customer's email address may require being updated to an address with the new company.

In an embodiment, customer data 228 includes all data associated with customers or end users of supply chain network 100. Customer data 228 may include various SPI data, as well as other customer data that is not SPI, such as publicly available information or other information that is not personally identifiable. Customer data 228 which is SPI may include data such as addresses, phone numbers, payment information, customer profile information, customer identification numbers or any other personally identifiable information of customers. Customer data 228 may further include data from customer interactions with CSRs, customer queries to sellers or other supply chain entities, customer purchase histories, and customer messages.

As discussed above, archiving system 120 comprises server 122 and database 124. Although archiving system 120 is shown as comprising a single server 122 and a single database 124, embodiments contemplate any suitable number of servers 122 or databases 124 internal to or externally coupled with archiving system 120.

Server 122 comprises data retrieval module 230. Although server 122 is shown and described as comprising a single data retrieval module 230, embodiments contemplate any suitable number or combination of data retrieval modules 230 located at one or more locations, local to, or remote from archiving system 120, such as on multiple servers or computers at one or more locations in supply chain network 100.

In one embodiment, data retrieval module 230 receives historical supply chain data 232 from planning and execution system 130 and one or more supply chain entities 140, and stores historical supply chain data 232 in database 124. According to one embodiment, data retrieval module 230 may prepare historical supply chain 232 data for use as the training data of event-based data security system 110 by checking historical supply chain data 232 for errors and transforming historical supply chain data 232 to normalize, aggregate, and/or rescale historical supply chain data 232 to allow direct comparison of data received from different planning and execution systems, one or more supply chain entities, and/or one or more other locations local to, or remote from, archiving system 120. According to embodiments, data retrieval module 230 may receive data from one or more sources external to supply chain network 100, such as, for example, weather data, special events data, social media data, calendar data, and the like and stores the received data as historical supply chain data 232.

Database 124 may comprise one or more databases or other data storage arrangements at one or more locations, local to, or remote from, server 122. Database 124 comprises, for example, historical supply chain data 232. Although database 124 is shown and described as comprising historical supply chain data 232, embodiments contemplate any suitable number or combination of data, located at one or more locations, local to, or remote from, archiving system 120, according to particular needs.

Historical supply chain data 232 comprises historical data received from event-based data security system 110, archiving system 120, planning and execution system 130, one or more supply chain entities 140, and/or computer 150. Historical supply chain data 232 may comprise, for example, weather data, special events data, social media data, calendar data, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As discussed above, planning and execution system 130 comprises server 132 and database 134. Although planning and execution system 130 is shown as comprising a single server 132 and a single database 134, embodiments contemplate any suitable number of servers 132 or databases 134 internal to or externally coupled with planning and execution system 130.

Server 132 comprises planning module 240 and prediction module 242. Although server 132 is shown and described as comprising a single planning module 240 and a single prediction module 242, embodiments contemplate any suitable number or combination of planning modules 240 and prediction modules 242 located at one or more locations, local to, or remote from planning and execution system 130, such as on multiple servers or computers at one or more locations in supply chain network 100.

Database 134 may comprise one or more databases or other data storage arrangements at one or more locations, local to, or remote from, server 132. Database 134 comprises, for example, transaction data 250 such as order and shipment data, supply chain data 252, product data 254, inventory data 256 including inventory policies, store data 258, customer data 260, demand forecasts 262, supply chain models 264, and prediction models 266. Although database 134 is shown and described as comprising transaction data 250, supply chain data 252, product data 254, inventory data 256, store data 258, customer data 260, demand forecasts 262, supply chain models 264, and prediction models 266, embodiments contemplate any suitable number or combination of data, located at one or more locations, local to, or remote from, planning and execution system 130, according to particular needs.

Planning module 240 of planning and execution system 130 works in connection with prediction module 242 to generate a plan based on one or more predicted retail volumes, classifications, or other predictions. By way of example and not of limitation, planning module 240 may comprise a demand planner that generates a demand forecast for one or more supply chain entities. Planning module 240 may generate the demand forecast, at least in part, from predictions and calculated factor values for one or more causal factors received from prediction module 242. By way of a further example, planning module 240 may comprise an assortment planner and/or a segmentation planner that generates product assortments that match causal effects calculated for one or more customers or products by prediction module 242, which may provide for increased customer satisfaction and sales, as well as reducing costs for shipping and stocking products at stores where they are unlikely to sell.

Prediction module 242 of planning and execution system 130 applies samples of transaction data 250, supply chain data 252, product data 254, inventory data 256, store data 258, customer data 260, demand forecasts 262, and other data to prediction models 266 to generate predictions and calculated factor values for one or more causal factors. In embodiments, prediction module 242 predicts a volume Y (target) from a set of causal factors X along with causal factors strengths that describe the strength of each causal factor variable contributing to the predicted volume. According to some embodiments, prediction module 242 generates predictions at daily intervals. However, embodiments contemplate longer and shorter prediction phases that may be performed, for example, weekly, twice a week, twice a day, hourly, or the like.

Transaction data 250 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 250 is represented by any suitable combination of values and dimensions, aggregated or un-aggregated, such as, for example, sales per week, sales per week per location, sales per day, sales per day per season, or the like.

Supply chain data 252 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities.

Product data 254 may comprise products identified by, for example, a product identifier (such as a Stock Keeping Unit (SKU), Universal Product Code (UPC) or the like), and one or more attributes and attribute types associated with the product ID. Product data 254 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 256 may comprise any data relating to current or projected inventory quantities or states, order rules, or the like. For example, inventory data 256 may comprise the current level of inventory for each item at one or more stocking points across supply chain network 100. In addition, inventory data 256 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 256 in the database, which may be used by planning and execution system 130 to place orders, set inventory levels at one or more stocking points, initiate manufacturing of one or more components, or the like in response to, and based at least in part on, a forecasted demand of event-based data security system 110.

Inventory data 256 may also include one or more inventory policies. The inventory policies may comprise any suitable inventory policy describing the reorder point and target quantity, or other inventory policy parameters that set rules for event-based data security system 110 and/or planning and execution system 130 to manage and reorder inventory. The inventory policies may be based on target service level, demand, cost, fill rate, or the like. According to embodiments, the inventory policies comprise target service levels that ensure that a service level of one or more supply chain entities is met with a set probability. For example, one or more supply chain entities may set a service level at 95%, meaning supply chain entities will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, planning and execution system 130 may determine a replenishment order according to one or more replenishment rules, which, among other things, indicates to one or more supply chain entities to determine or receive inventory to replace the depleted inventory. By way of example only and not by way of limitation, an inventory policy for non-perishable goods with linear holding and shorting costs comprises a min./max. (s,S) inventory policy. Other inventory policies may be used for perishable goods, such as fruit, vegetables, dairy, fresh meat, as well as electronics, fashion, and similar items for which demand drops significantly after a next generation of electronic devices or a new season of fashion is released.

Store data 258 may comprise data describing the stores of one or more retailers and related store information. Store data 258 may comprise, for example, a store ID, store description, store location details, store location climate, store type, store opening date, lifestyle, store area (expressed in, for example, square feet, square meters, or other suitable measurement), latitude, longitude, and other similar data.

Customer data 260 may comprise customer identity information, including, for example, customer relationship management data, loyalty programs, and mappings between product purchases and one or more customers so that a customer associated with a transaction may be identified. Customer data 260 may comprise data relating customer purchases to one or more products, geographical regions, store locations, or other types of dimensions. In an embodiment, customer data 260 may also comprise customer profile information including demographic information and preferences.

Demand forecasts 262 of the database may indicate future expected demand based on, for example, any data relating to past sales, past demand, purchase data, promotions, events, or the like of one or more supply chain entities. Demand forecasts 262 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately $2 \times 10^{10}$ demand forecasts each day to derive the optimal order volume for the next delivery cycle (e.g. three days).

Supply chain models 264 of the database comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 264 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Prediction models 266 comprise one or more of the trained models used by planning and execution system 130 for predicting, among other variables, pricing, targeting, or retail volume, such as, for example, a forecasted demand volume for one or more products at one or more stores of one or more retailers based on the prices of the one or more products.

Figure 3:
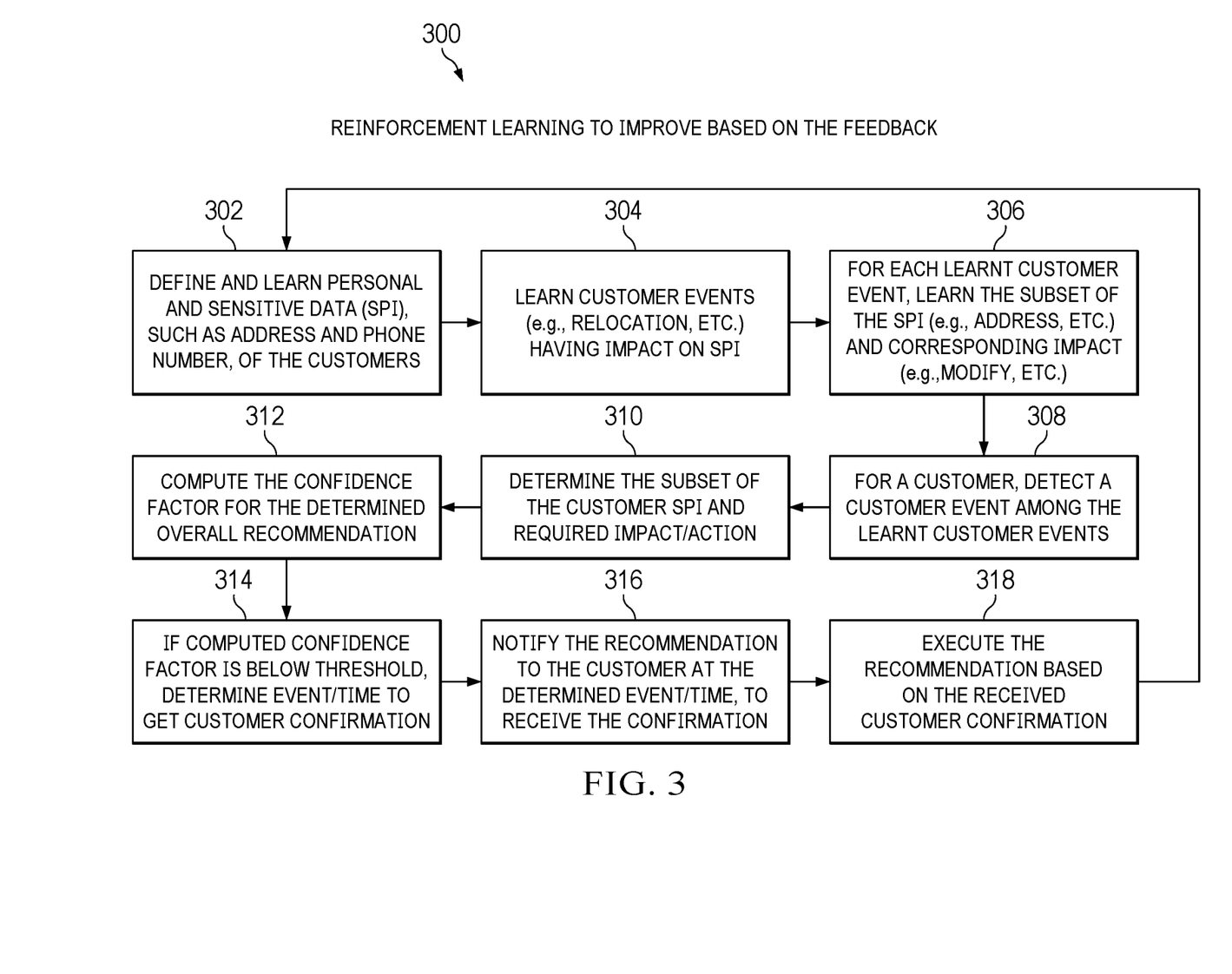
FIG. 3 illustrates an example method for detecting and handling customer events, according to an embodiment.

FIG. 3 illustrates an example method 300 for detecting and handling customer events, according to an embodiment. Method 300 may be performed by an event-based data security system, such as event-based data security system 110 of FIG. 1. Method 300 proceeds by one or more activities, which although described in a particular order may be performed in one or more permutations, combinations, orders, or repetitions, according to particular needs.

At activity 302, event-based data security system 110 defines and learns personal and sensitive information (SPI) data of customers, or users, within supply chain network 100. SPI data may include data such as address, phone numbers and like information. As described in further detail above, event-based data security system 110 may define SPI categories by performing internet searches to determine what categories of SPI should be afforded special treatment for data privacy reasons.

At activity 304, event-based data security system 110 learns customer events that have an impact on the SPI. In embodiments, the customer events may include, for example, relocations from one address to another. As described in further detail above, event-based data security system 110 may use one or more NLP techniques to monitor customer interactions and messages to determine when certain keywords or phrases are associated with events that may indicate a change to customer SPI, or the need and desirability of continued storage of customer SPI.

At activity 306, event-based data security system 110, for each customer event learned at the second activity, learns a subset of the SPI and the corresponding impact or required action. Continuing the example above, for a "relocation" event the subset of the SPI related to the relocation event may be "customer address" and the corresponding impact may be a required modification or update to the customer address.

At activity 308, event-based data security system 110, for a particular customer, detects a customer event from among the customer events learned at the second action. In embodiments, event-based data security system 110 may use NLP techniques to monitor customer messages to determine that an event as previously defined has occurred or will occur for the customer. Event-based data security system 110 may also monitor customer data, such as customer location data associated with a mobile device of the customer, to detect certain events, such as temporary or permanent relocation events.

At activity 310, event-based data security system 110 determines the subset of the customer's SPI affected by the customer event detected at the third activity, and the corresponding impact of the customer event. Event-based data security system 110 may determine the subset of SPI according to a definition of the customer event, which may include the SPI categories associated with a particular event, as well as the actions that need to be taken on those SPI categories.

At activity 312, event-based data security system 110 computes a confidence factor for a determined overall recommendation. At activity 314, if the confidence factor computed at activity 312 is below a threshold, event-based data security system 110 determines a time to obtain customer confirmation of the customer event and required action. In embodiments, event-based data security system 110 may determine an event, rather than a time, which would trigger notifying the customer to obtain confirmation.

At activity 316, event-based data security system 110 notifies the customer of the recommended action at the time determined at activity 314. In embodiments, event-based data security system 110 may instead notify the customer at a time that the event is detected to occur. For example, if event-based data security system 110 determines a movement event will happen in the future by monitor customer service interaction data, event-based data security system 110 may wait to prompt the customer to confirm the event until location data of the customer indicates the movement has occurred. Event-based data security system 110 may thereafter monitor for receipt of a confirmation decision from the customer.

At activity 318, event-based data security system 110 executes the recommended action based on a received customer confirmation. For example, the customer may, in response to a prompt on a computing device associated with the user or via a text message or email, confirm that the customer has relocated to a new address, and that the customer's address should be updated accordingly.

After activity 318, event-based data security system 110 performs reinforcement learning in order to improve overall event detection and recommendation, based on feedback received from the customer. This may be performed iteratively in order to continuously improve the accuracy of the recommendations presented by event-based data security system 110. After the reinforcement learning is performed, method 300 may return to activity 302. Method 300 may be performed iteratively until stopping criteria is met or until a user chooses to cease the operation of method 300 or event-based data security system 110.

Figure 4:
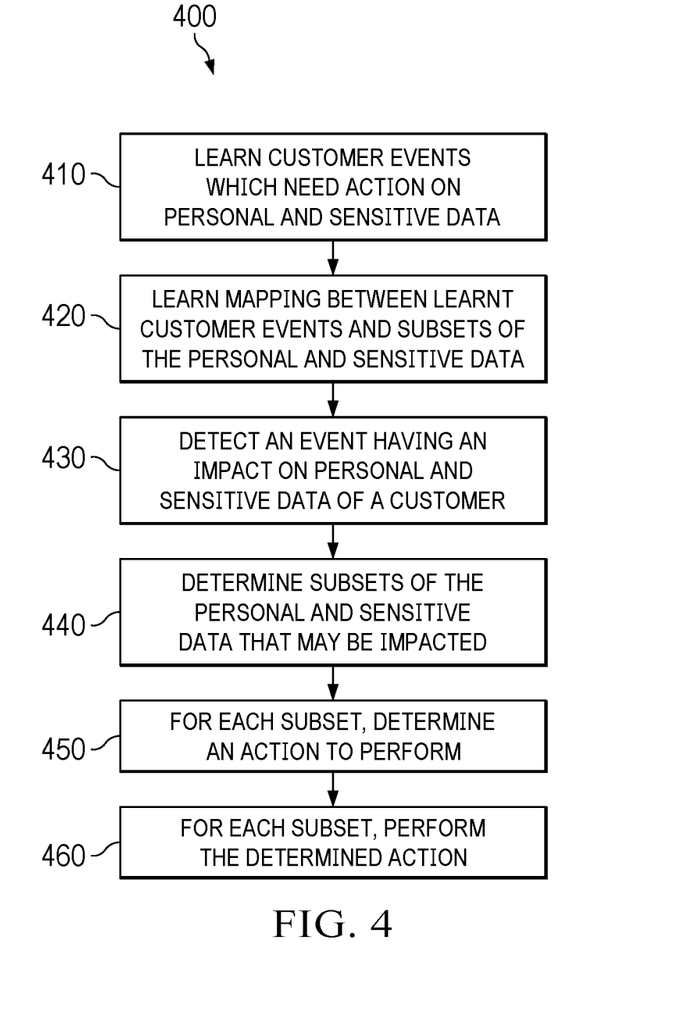
FIG. 4 illustrates an example method for event-based data security, according to an embodiment.

FIG. 4 illustrates example method 400 for event-based data security, according to an embodiment. Method 400 may be performed by an event-based data security system, such as event-based data security system 110 of FIG. 1. Method 400 proceeds by one or more activities, which although described in a particular order may be performed in one or more permutations, combinations, orders, or repetitions, according to particular needs.

At activity 410, event-based data security system 110 learns customer events which need an action on SPI data. Event-based data security system 110 may use one or more data streams to learn the customer events, such as security policies, customer interactions, publicly available information and a product catalog.

At activity 420, event-based data security system 110 learns a mapping between the customer events and subsets of the SPI data. Event-based data security system 110 may use one or more data streams to learn the mappings, such as security policies, customer interactions, publicly available information and a product catalog.

At activity 430, event-based data security system 110 detects, for a particular customer, an event having an impact on the sensitive data of the customer. Event-based data security system 110 may use one or more data streams to detect the event, such as the customer events learned at the first activity, and customer data of the customer, including customer interactions of the customer, customer queries of the customer, a purchase history of the customer and messages of the customer.

At activity 440, event-based data security system 110 determines subsets of the SPI data that may be impacted by the event detected at the third activity. Event-based data security system 110 may use one or more data streams to detect the event, such as the mappings between events and SPI learned at the second activity, and customer data of the customer, including customer interactions of the customer, customer queries of the customer, a purchase history of the customer and messages of the customer.

At activity 450, event-based data security system 110 determines for each subset of the SPI data determined at activity 440 an action to perform on the subset of SPI data, such as moving, modifying, masking or removing the SPI data. Event-based data security system 110 may use one or more data streams to detect the event, such customer data of the customer, including customer interactions of the customer, customer queries of the customer, a purchase history of the customer and messages of the customer.

At activity 460, event-based data security system 110 performs the actions determined at activity 450. For example, event-based data security system 110 may move the SPI data, or a subset thereof, from a first data center to a second data center, may continue to store the SPI data after masking (that is, identify removal), may modify a customer profile of the customer, or may remove a particular subset of the SPI data, though other actions may be taken by event-based data security system 110 in response to a detected event. In embodiments, before performing an action on the SPI data, event-based data security system 110 may prompt the customer to confirm the event or confirm the action to be performed on the customer's SPI data.

Consider the following example to illustrate the operation of the systems and methods described above. Customer A lives in London, and over the last several years has been a loyal customer of retailer B, with orders of various types of items over that time. Customer A receives a job offer in New York and is moving to the US in a few weeks. Customer A mentions the same to a customer service representative of Retailer B while ordering corrugated boxes for the upcoming move.

Using existing data storage system, systems, Customer A's data is kept in a UK data center even after his movement to the US, per Retailer B's data retention policy, for a long period, around 2½ months (3 months after last activity). All of Customer A's data is deleted from the UK data center after 3 months of inactivity. If, afterwards, Customer A wants to order from Retailer B again, Customer A may have to go through new profile creation when he places his first order from the US.

Using the systems and methods disclosed herein, Retailer B's event-based data security system 110 determines that the customer record for Customer A should be continued, as Retailer B operates in both the UK and the US, where Customer A is moving. However, event-based data security system 110 marks Customer A's UK address records for deletion, after confirmation, 3 weeks from now. As soon as Customer A's location data shows a US location, event-based data security system 110 sends an email to Customer A that his address records are being deleted and his profile is moving from a UK data center to a US data center. Event-based data security system 110 deletes the address records and moves Customer A's customer record to retain Customer A as a US customer. Customer A feels "taken care of" as a customer, and feels pride in being associated with Retailer B.

Altering the above example, if Customer A wants to keep his customer profile and simply update the customer address, event-based data security system 110 enables him to do so, which also happens to be the recommended action of event-based data security system 110 based on the security policies of Retailer B.

Altering the above example, suppose Customer A moves back to London before the data retention period of 3 months ends. In such a situation, where Customer A moves back to London after event-based data security system 110 has moved the data to the US data center, event-based data security system 110 will perform the reverse action, that is, Customer A's US address is removed, his new (or resumed) UK address is added, and Customer A's customer data is moved back to the UK data center.

Altering the above example, suppose Customer A is merely on vacation to the US, and the change to his location is temporary. In such a situation, event-based data security system 110 may determine if Customer A's movement is temporary or vacation related, using data such as Customer A's purchase history or previous travel history, and if the movement is determined to be temporary, event-based data security system 110 will not recommend any change to Customer A's data.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system, comprising:
    a computer, comprising a processor and a memory, the computer configured to:
    learn one or more customer events which require an action on sensitive and personal information;
    learn a mapping between the one or more customer events and one or more first subsets of the sensitive and personal information;
    detect, for a particular customer, an event having an impact on the sensitive and personal information of the particular customer;
    determine one or more second subsets of the sensitive and personal information that may be impacted by the event;
    determine an action to perform for each of the one or more second subsets of the sensitive and personal information; and
    perform the action on each of the one or more second subsets of sensitive and personal information.

2. The system of claim 1, wherein the computer is further configured to:
    learn the mapping using one or more data streams, wherein the one or more data streams comprise one or more of: one or more security policies, one or more customer interactions, publicly available information and a product catalog.

3. The system of claim 1, wherein the event comprises one or more of:
    one or more customer interactions of the particular customer, one or more customer queries of the particular customer, a purchase history of the particular customer and one or more messages of the particular customer.

4. The system of claim 1, wherein the action comprises moving the sensitive and personal information, modifying the sensitive and personal information, masking the sensitive and personal information or removing the sensitive and personal information.

5. The system of claim 1, wherein the sensitive and personal information comprises one or more of:
    an address, a phone number, payment information, customer profile information, a customer identification number, a customer interaction with a CSR, a customer query to a seller, a customer purchase history and one or more customer messages.

6. The system of claim 1, wherein the computer is further configured to:
    determine one or more categories of sensitive and personal information and present the one or more categories for approval.

7. The system of claim 1, wherein the computer is further configured to:
    detect, for the particular customer, the event based on, at least in part, configuring a threshold.

8. A computer-implemented method, comprising:
    learning, by a computer comprising a processor and a memory, one or more customer events which require an action on sensitive and personal information;
    learning, by the computer, a mapping between the one or more customer events and one or more first subsets of the sensitive and personal information;
    detecting, by the computer, for a particular customer, an event having an impact on the sensitive and personal information of the particular customer;
    determining, by the computer, one or more second subsets of the sensitive and personal information that may be impacted by the event;
    determining, by the computer, an action to perform for each of the one or more second subsets of the sensitive and personal information; and
    performing, by the computer, the action on each of the one or more second subsets of sensitive and personal information.

9. The computer-implemented method of claim 8, further comprising:
    learning, by the computer, the mapping using one or more data streams, wherein the one or more data streams comprise one or more of: one or more security policies, one or more customer interactions, publicly available information and a product catalog.

10. The computer-implemented method of claim 8, wherein the event comprises one or more of:
    one or more customer interactions of the particular customer, one or more customer queries of the particular customer, a purchase history of the particular customer and one or more messages of the particular customer.

11. The computer-implemented method of claim 8, wherein the action comprises moving the sensitive and personal information, modifying the sensitive and personal information, masking the sensitive and personal information or removing the sensitive and personal information.

12. The computer-implemented method of claim 8, wherein the sensitive and personal information comprises one or more of:
    an address, a phone number, payment information, customer profile information, a customer identification number, a customer interaction with a CSR, a customer query to a seller, a customer purchase history and one or more customer messages.

13. The computer-implemented method of claim 8, further comprising:
    determining, by the computer, one or more categories of sensitive and personal information and present the one or more categories for approval.

14. The computer-implemented method of claim 8, further comprising:
   detecting, by the computer, for the particular customer, the event based on, at least in part, configuring a threshold.

15. A non-transitory computer-readable medium embodied with software, the software when executed is configured to:
   learn, by a computer comprising a processor and a memory, one or more customer events which require an action on sensitive and personal information;
   learn a mapping between the one or more customer events and one or more first subsets of the sensitive and personal information;
   detect, for a particular customer, an event having an impact on the sensitive and personal information of the particular customer;
   determine one or more second subsets of the sensitive and personal information that may be impacted by the event;
   determine an action to perform for each of the one or more second subsets of the sensitive and personal information; and
   perform the action on each of the one or more second subsets of sensitive and personal information.

16. The non-transitory computer-readable medium of claim 15, wherein the software when executed is further configured to:
   learn the mapping using one or more data streams, wherein the one or more data streams comprise one or more of: one or more security policies, one or more customer interactions, publicly available information and a product catalog.

17. The non-transitory computer-readable medium of claim 15, wherein the event comprises one or more of:
   one or more customer interactions of the particular customer, one or more customer queries of the particular customer, a purchase history of the particular customer and one or more messages of the particular customer.

18. The non-transitory computer-readable medium of claim 15, wherein the action comprises moving the sensitive and personal information, modifying the sensitive and personal information, masking the sensitive and personal information or removing the sensitive and personal information.

19. The non-transitory computer-readable medium of claim 15, wherein the sensitive and personal information comprises one or more of:
   an address, a phone number, payment information, customer profile information, a customer identification number, a customer interaction with a CSR, a customer query to a seller, a customer purchase history and one or more customer messages.

20. The non-transitory computer-readable medium of claim 19, wherein the software when executed is further configured to:
   determine one or more categories of sensitive and personal information and present the one or more categories for approval.

* * * * *